(12) United States Patent
Radovic et al.

(10) Patent No.: US 7,529,844 B2
(45) Date of Patent: May 5, 2009

(54) MULTIPROCESSING SYSTEMS EMPLOYING HIERARCHICAL SPIN LOCKS

(75) Inventors: Zoran Radovic, Uppsala (SE); Erik E. Hagersten, Uppsala (SE)

(73) Assignee: Sun Microsystems, Inc., Santa Clara, CA (US)

( * ) Notice: Subject to any disclaimer, the term of this patent is extended or adjusted under 35 U.S.C. 154(b) by 1134 days.

(21) Appl. No.: 10/422,454

(22) Filed: Apr. 24, 2003

(65) Prior Publication Data

US 2003/0236817 A1 Dec. 25, 2003

Related U.S. Application Data

(60) Provisional application No. 60/375,742, filed on Apr. 26, 2002.

(51) Int. Cl.
*G06F 15/16* (2006.01)
(52) U.S. Cl. .................. 709/229; 709/248; 709/249; 709/213; 709/217; 717/149; 711/100
(58) Field of Classification Search .............. 709/203, 709/248, 213, 217, 229; 717/149; 711/100
See application file for complete search history.

(56) References Cited

U.S. PATENT DOCUMENTS

| | | | | |
|---|---|---|---|---|
| 5,263,161 A | * | 11/1993 | Barth et al. | 711/152 |
| 5,303,362 A | * | 4/1994 | Butts et al. | 711/121 |
| 5,305,448 A | * | 4/1994 | Insalaco et al. | 711/164 |
| 5,404,482 A | * | 4/1995 | Stamm et al. | 711/145 |
| 5,987,550 A | * | 11/1999 | Shagam | 710/119 |
| 6,182,195 B1 | * | 1/2001 | Laudon et al. | 711/141 |
| 6,523,078 B1 | * | 2/2003 | Desai | 710/200 |
| 6,823,511 B1 | * | 11/2004 | McKenney et al. | 718/102 |
| 7,058,948 B2 | * | 6/2006 | Hoyle | 718/104 |
| 7,065,763 B1 | * | 6/2006 | Martin et al. | 718/102 |

(Continued)

OTHER PUBLICATIONS

Thomas E. Andreson; "The Performance of Spin Lock Alternatives for Shared-Memory Multiprocessors"; IEEE Transactions on Parallel and Distributed Systems; Jan. 1990; pp. 6-16; vol. 1, No. 1.

(Continued)

*Primary Examiner*—Kenny S Lin
*Assistant Examiner*—Lan-Dai T Truong
(74) *Attorney, Agent, or Firm*—Meyertons Hood Kivlin Kowert & Goetzel, P.C.; B. Noël Kivlin; Stephen J. Curran

(57) ABSTRACT

A method for controlling a software lock acquirable by processors in a plurality of nodes of a multiprocessing system is disclosed. The method comprises a first processor of a first node of the plurality of nodes acquiring the lock, and the first processor selectively releasing the lock in a first state that allows other processors within the first node to acquire the lock but that prevents processors in a remote node of the plurality of nodes from obtaining the lock. In another embodiment, a method comprises a first processor of a first node attempting to acquire the lock, the first processor determining whether another processor within the same node is remotely spinning on the lock, and the first processor remotely spinning on the lock in response to determining that another processor in the same node is not remotely spinning on the software lock.

18 Claims, 5 Drawing Sheets

U.S. PATENT DOCUMENTS

| | | | |
|---|---|---|---|
| 7,080,375 B2* | 7/2006 | Martin | 718/100 |
| 2001/0016947 A1* | 8/2001 | Nishikawa et al. | 725/51 |
| 2002/0052959 A1* | 5/2002 | Freitas et al. | 709/226 |
| 2002/0087769 A1* | 7/2002 | McKenney et al. | 710/200 |
| 2002/0199045 A1* | 12/2002 | Browning et al. | 710/100 |
| 2003/0037178 A1* | 2/2003 | Vessey et al. | 709/319 |

OTHER PUBLICATIONS

L. Barroso, K. Gharachorloo, R. McNamara, A. Nowatzyk, S. Qadeer, B. Sano, S. Smith, R. Stets, and B. Verghese; "Piranha: A Scalable Architecture Based on Single-Chip Multiprocessing"; In Proceedings of the 27th Annual International Symposium on Computer Architecture (ISCA'00); Jun. 2000; pp. 282-293.

L. A. Barroso, K. Gharachorloo, and E. Bugnion; "Memory System Characterization of Commercial Workloads"; In Proceedings of the 25th Annual International Symposium on Computer Architecture (ISCA'98); Jun. 1998; pp. 3-14.

Alan Charlesworth; "The Sun Fireplace System Interconnect"; In Proceedings of Supercomputing 2001, Nov. 2001; 14 pages.

K. Gharachorloo, M. Sharma, S. Steely, and S. Van Doren; "Architecture and Design of AlphaServer GS320"; In Proceedings of the 9th International Conference on Architectural Support for Programming Languages and Operating Systems (ASPLOS-IX); Nov. 2000; pp. 13-24.

James R. Goodman, Mary. K. Vernon, and Philip. J. Woest; "Efficient Synchronization Primitives for Large-Scale Cache-Coherent Multiprocessors"; In Proceedings of the $3_{rd}$ International Conference on Architectural Support for Programming Languages and Operating Systems (ASPLOS-III); Apr. 1989; pp. 64-75.

Gary Graunke and Shreekant Thakkar; "Synchronization Algorithms for Shared Memory Multiprocessors"; IEEE Computer; 1990; pp. 60-69; vol. 23, No. 6.

Erik Hagersten and Michael Koster; "WildFire: A Scalable Path for SMPs"; In Proceedings of the 5th IEEE Symposium on High-Performance Computer Architecture; Feb. 1999; pp. 172-181.

Alain Kägi, Doug Burger and. James R. Goodman; "Efficient Synchronization: Let Them Eat QOLB"; In Proceedings of the $24^{th}$ Annual International Symposium on Computer Architecture (ISCA'97); Jun. 1997; pp. 170-180.

James Laudon and Daniel Lenoski; "The SGI Origin: A ccNUMA Highly Scalable Server"; In Proceedings of the 24th Annual International Symposium on Computer Architecture (ISCA'97); Jun. 1997; pp. 241-251.

D. Lenoski, J. Laudon, K. Gharachorloo, W-D Weber, A. Gupto, J. Hennessy, M. Horowitz and M. S. Lam. "The Stanford Dash Multiprocessor"; IEEE Computer; Mar. 1992; pp. 63-79; vol. 25, No. 3.

Beng-Hong Lim; Reactive Synchronization Algorithms for Multiprocessors. In Proceedings of the 6th International Conference on Architectural Support for Programming Languages and Operating Systems (ASPLOS-VI); Oct. 1994; pp. 25-35.

Tom Lovett and Russell Clapp; "STiNG: A CC-NUMA Computer System for the Commercial Marketplace"; In Proceedings of the 23rd Annual International Symposium on Computer Architecture (ISCA'96 ); May 1996; pp. 308-317.

Peter Magnusson, Anders Landin and Erik Hagersten; "Queue Locks on Cache Coherent Multiprocessors"; In Proceedings of the 8th International Parallel Processing Symposium; Apr. 1994; pp. 165-171; Cancun, Mexico.

Larry McVoy and Carl Staelin; "lmbench: Portable Tools for Performance Analysis"; In Proceedings of the 1996 USENIX Annual Technical Conference; Jan. 1996; pp. 279-294.

John M. Mellor-Crummey and Michael Scott; "Algorithms for Scalable Synchronization on Shared-Memory Multiprocessors"; ACM Transactions on Computer Systems; Feb. 1991; pp. 21-65; vol. 9, No. 1.

Lisa Noordergraaf and Ruud Van Der Pas; "Performance Experiences on Sun's Wildfire Prototype"; Proceedings of Supercomputing; Nov. 1999; 16 pages.

Larry Rudolph and Zary Segall; "Dynamic Decentralized Cache Schemes for MIMD Parallel Processor"; In Proceedings on the 11th Annual International Symposium on Computer Architecture (ISCA'84); Jun. 1984; pp. 340-347.

Michael L. Scott and William N. Scherer; "Scalable Queue-Based Spin Locks with Timeout"; In Proceedings of the eight ACM SIGPLAN symposium on Principles and practices of parallel programming; Jun. 2001; pp. 44-52; Snowbird, Utah, USA.

Jaswinder Pal Singh, Anoop Gupta and Marc Levoy; "Parallel Visualization Algorithms: Performance and Architectural Implications"; IEEE Computer; Jul. 1994; pp. 45-55; vol. 27, No. 7.

A. Singhal, D. Broniarczyk, F. Cerauskis, J. Price, L. Yuan, C. Cheng, D. Doblar, S. Fosth, N. Agarwal, K. Harvey, E. Hagersten, and B. Liencres; "Gigaplane: A High Performance Bus for Large SMPs"; In Proceedings of IEEE Hot Interconnects IV; Aug. 1996; pp. 41-52.

J. M. Tendler, S. Dodson, S. Fields, H. Le, and B. Sinharoy; "Power4 system microarchitecture"; IBM Journal of Research and Development; Jan. 2002; 21 pages; vol. 46, No. 1.

Steven Cameron Woo, Moriyoshi Ohara, Evan Torrie, Jaswinder. Pal Singh and Anoop Gupta; "The SPLASH-2 Programs: Characterization and Methodological Considerations"; In Proceedings of the $22^{nd}$ Annual International Symposium on Computer Architecture; Jun. 1995; pp. 24-36.

* cited by examiner

MULTIPROCESSING SYSTEMS EMPLOYING HIERARCHICAL SPIN LOCKS

This application claims the benefit of U.S. Provisional Application No. 60/375,742, entitled "Scalable Hierarchical Spin-Lock", filed Apr. 26, 2002.

BACKGROUND OF THE INVENTION

1. Field of the Invention

This invention relates to the field of multiprocessor computer systems and, more particularly, to mechanisms and methods for optimizing spin-lock operations within multiprocessor computer systems.

2. Description of the Related Art

A popular architecture in commercial multiprocessing computer systems is a distributed shared memory architecture. A distributed shared memory architecture includes multiple nodes within which processors and memory reside. The multiple nodes communicate via a network coupled there between. When considered as a whole, the memory included within the multiple nodes forms the shared memory for the computer system. Typically, directories are used to identify which nodes have cached copies of data corresponding to a particular address. Coherency activities may be generated via examination of the directories.

Distributed shared memory systems are scaleable, overcoming various limitations associated with shared bus architectures. Since many of the processor accesses are completed within a node, nodes typically have much lower bandwidth requirements upon the network in comparison to the bandwidth requirements a shared bus architecture must provide upon its shared bus to attain comparable performance. The nodes may operate at high clock frequency and bandwidth, accessing the network when needed. Additional nodes may be added to the network without affecting the local bandwidth of the nodes. Instead, only the network bandwidth is affected.

Many distributed shared memory architectures have non-uniform access time to the shared memory. Such architectures are known as non-uniform memory architectures (NUMA). Most systems that form NUMA architectures also have the characteristic of a non-uniform communication architecture (NUCA), in which the access time from a processor the other processors' caches varies greatly depending on their placement. In particular, node-based NUMA systems, where a group of processors have a much shorter access time to each other's caches than to the other caches, are common. Recently, technology trends have made it attractive to run more than one thread per chip, using either the chip multiprocessor (CMP) and/or the simultaneous multi-threading (SMT) approach. Large servers, built from several such chips, can therefore be expected to form NUCA architectures, since collated threads will most likely share an on-chip cache at some level.

Due to the popularity of NUMA systems, optimizations directed to such architectures have attracted much attention in the past. For example, optimizations involving the migration and replication of data in NUMA systems have demonstrated a great performance improvement in many applications. In addition, since many of today's applications exhibit a large fraction of cache-to-cache misses, optimizations which consider the NUCA nature of a system may also lead to significant performance enhancements.

One particular problem associated with multiprocessing computer systems having distributed shared memory architectures relates to spin-lock operations. In general, spin-lock operations are associated with software locks that are used by programs to ensure that only one parallel process at a time can access a critical region of memory. A variety of lock implementations have been proposed, ranging from simple spinlocks to advanced queue-based locks. Although simple spinlock implementations can create very bursty traffic as described below, they are still the most commonly used software lock within computer systems.

Systems employing spin-lock implementations typically require that a given process perform an atomic operation to obtain access to a critical memory region. For example, an atomic test-and-set operation is commonly used. The test-and-set operation is performed to determine whether a lock bit associated with the memory region is cleared and to atomically set the lock bit. That is, the test allows the thread to determine whether the memory region is free of a lock by another thread, and the set operation allows the thread to acquire the lock if the lock bit is cleared. If the test of the lock bit indicates that the memory region is currently locked, the thread initiates a software loop wherein the lock bit is continuously read until the lock bit is detected as cleared, at which time the thread reinitiates the atomic test-and-set operation.

When several spinning processors contend for access to the same memory region, a relatively large number of transaction requests may be generated. Since only one of the spinning processors will acquire the lock during such contention, the failed test-and-set operations of the remaining processors result in undesirable requests on the network. Due to this, the latency associated with the release of a lock until the next contender can acquire the lock may be relatively high. In addition, the large number of transactions can further limit the maximum frequency at which ownership of the lock can migrate from processor to processor and node to node. Still further, depending upon the order in which granting of the lock to different processors is performed, the lock (and the data lock is protecting) may migrate back and forth between nodes, invalidating other copies. This may result in yet additional undesirable network traffic.

Other spin-lock implementations have therefore been proposed to improve performance and reduce network traffic when contention for a lock exists. For example, in some implementations, the burst of refill traffic when a lock is released may be reduced by using an exponential back-off delay in which, after failing to obtain a lock, the requester waits for successively longer periods of time before initiating additional lock operations. In other implementations, queue-based locking methodologies have been employed to reduce network traffic. In a system that implements a queue-based lock, requesting processors contending for a lock are queued in an order. A contending processor generates transactions to acquire the lock only if it is the next in line contender. Numerous variations of queue-based lock implementations are known.

While the various optimizations for spin-lock implementations have in some instances led to enhanced performance, most solutions do not consider or exploit the NUCA characteristics of a distributed shared memory computer system. In addition, many implementations have resulted in relatively high latencies for uncontended locks. A mechanism and methodology are therefore desirable that may exploit the NUCA nature of a multiprocessing system to optimize spin-lock operations without introducing significant latencies for uncontended locks.

SUMMARY OF THE INVENTION

Various embodiments of multiprocessing computer systems and methods are provided that implement hierarchical spin locks. In one embodiment, a method for controlling a software lock acquirable by processors in a plurality of nodes of a multiprocessing system is disclosed. The method comprises a first processor of a first node of the plurality of nodes acquiring the lock, and the first processor selectively releasing the lock in a first state that allows other processors within the first node to acquire the lock but that prevents processors in a remote node of the plurality of nodes from obtaining the lock. In this manner, node locality may result wherein a thread that is executing within the same node in which a lock has already been obtained will be more likely to subsequently acquire the lock when it is freed in relation to other contending threads executing in other nodes.

In another embodiment, a method for performing spin lock operations in a computer system is disclosed. The method comprises a first processor of a first node attempting to acquire the lock, the first processor determining whether another processor within the same node is remotely spinning on the lock, and the first processor remotely spinning on the lock in response to determining that another processor in the same node is not remotely spinning on the software lock.

Figure 1:
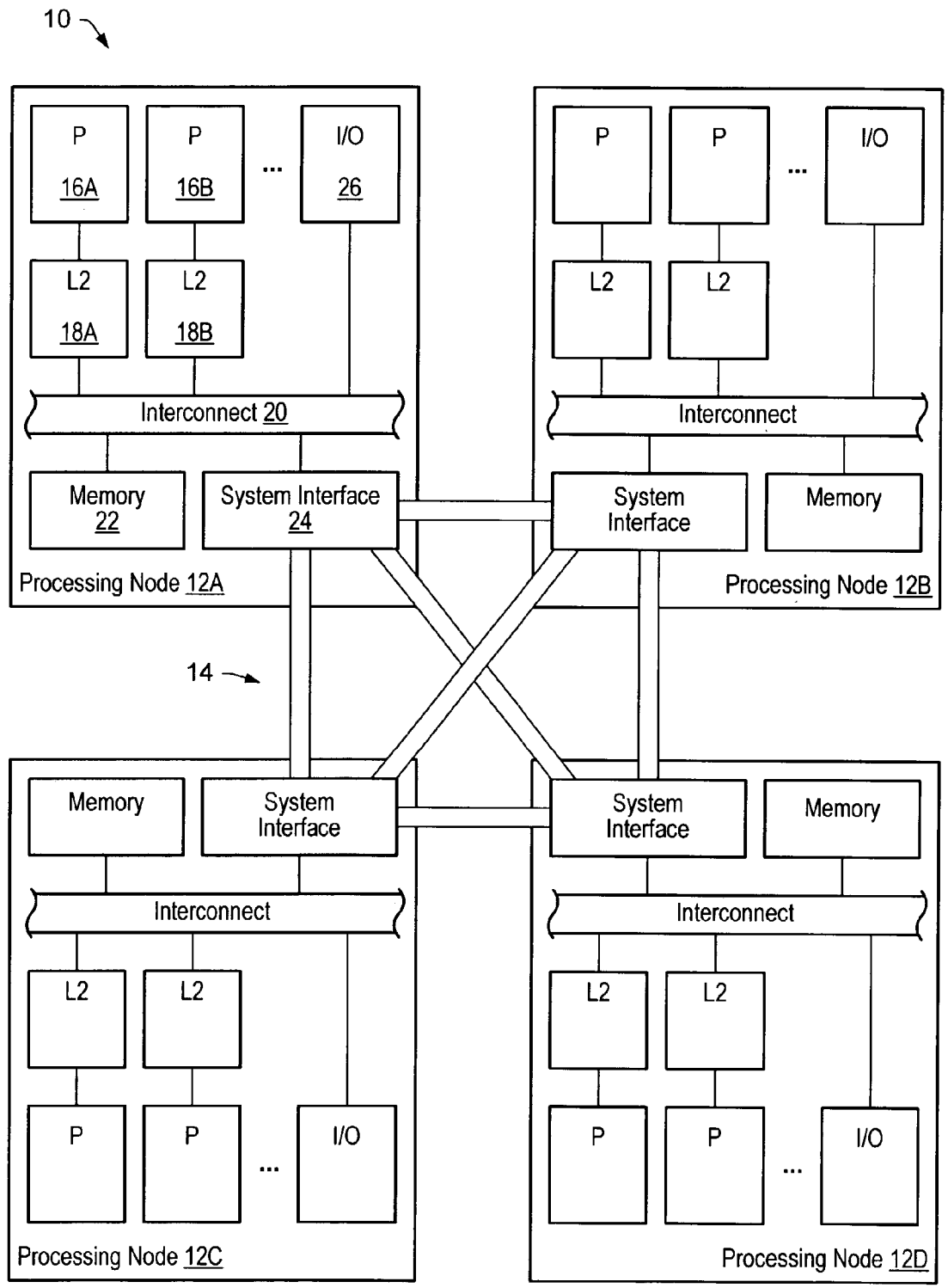
FIG. 1 is a block diagram of one embodiment of a multiprocessing computer system 10.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Turning now to FIG. 1, a block diagram of one embodiment of a multiprocessing computer system 10 is shown. Computer system 10 includes multiple processing nodes 12A-12D interconnected by a point-to-point network 14. Elements referred to herein with a particular reference number followed by a letter will be collectively referred to by the reference number alone. For example, processing nodes 12A-12D will be collectively referred to as processing nodes 12. In the embodiment shown, each processing node 12 includes multiple processors, caches, a memory, and a system interface. For example, processing node 12A is configured with multiple processors including processors 16A-16B. The processors 16 are connected to caches 18, which are further coupled to a node interconnect 20. Additionally, a memory 22 and a system interface 24 are coupled to node interconnect 20. Still further, one or more input/output (I/O) interfaces 26 may be coupled to node interconnect 20. I/O interfaces 26 are used to interface to peripheral devices such as serial and parallel ports, disk drives, modems, printers, etc. Other processing nodes 12B-12D may be configured similarly.

Each processing node 12 is a processing node having memory 22 as the shared memory. Processors 16 are high performance processors. In one embodiment, each processor 16 may employ an ultraSPARC® processor architecture. It is noted, however, that any processor architecture may be employed by processors 16.

Typically, processors 16 may include internal instruction and data caches. Therefore, caches 18 are labeled as L2 caches (for level 2, wherein the internal caches are level 1 caches). If processors 16 are not configured with internal caches, then external caches 18 are level 1 caches. It is noted that the "level" nomenclature is used to identify proximity of a particular cache to the processing core within processor 16. Level 1 is nearest the processing core, level 2 is next nearest, etc. Caches 18 provide rapid access to memory addresses frequently accessed by the processor 16 coupled thereto. It is noted that external caches 18 may be configured in any of a variety of specific cache arrangements. For example, set-associative or direct-mapped configurations may be employed by external caches 18. It is noted that in some embodiments, the processors 16 and caches 18 of a node may be incorporated together on a single integrated circuit in a chip multiprocessor (CMP) configuration.

Node interconnect 20 accommodates communication between processors 16 (e.g., through caches 18), memory 22, system interface 24, and I/O interface 26. In one embodiment, node interconnect 20 includes an address bus and related control signals, as well as a data bus and related control signals. Because the address and data buses are separate, a split-transaction bus protocol may be employed upon node interconnect 20. Generally speaking, a split-transaction bus protocol is a protocol in which a transaction occurring upon the address bus may differ from a concurrent transaction occurring upon the data bus. Transactions involving address and data include an address phase in which the address and related control information is conveyed upon the address bus, and a data phase in which the data is conveyed upon the data bus. Additional address phases and/or data phases for other transactions may be initiated prior to the data phase corresponding to a particular address phase. An address phase and the corresponding data phase may be correlated in a number of ways. For example, data transactions may occur in the same order that the address transactions occur. Alternatively, address and data phases of a transaction may be identified via a unique tag.

In alternative embodiments, node interconnect 20 may be implemented as a circuit-switched network or a packet-switched network. In embodiments where node interconnect 20 is a packet-switched network, packets may be sent through the data network using techniques such as wormhole, store and forward, or virtual cut-through. In a circuit-switched network, a particular device may communicate directly with a second device via a dedicated point-to-point link that may be established through a switched interconnect mechanism. To communicate with a different device, a different link is established through the switched interconnect. In some embodiments, separate address and data networks may be employed.

Memory 22 is configured to store data and instruction code for use by processors 16. Memory 22 preferably comprises dynamic random access memory (DRAM), although any type of memory may be used. Memory 22, in conjunction with similar illustrated memories in the other processing nodes 12, forms a distributed shared memory system. Each address in the address space of the distributed shared memory is assigned to a particular node, referred to as the home node of the address. A processor within a different node than the home node may access the data at an address of the home node, potentially caching the data. Therefore, coherency is maintained between processing nodes 12 as well as among processors 16 and caches 18 within a particular processing node 12A-12D. System interface 24 provides internode coherency, and may further perform snooping or other functionality on interconnect 20 to provide intranode coherency.

In various embodiments, data stored in a particular cache, such as cache 18A, may be accessed and used to service requests by other processors (e.g., processor 16B). In addition or alternatively, in various embodiments, portions of memory 22 may be allocated to cache data that is mapped to other nodes (i.e., data having remote home nodes). In this manner, data accessed by a processor 16 may be cached in an allocated location of the memory 22 of that node to allow quicker subsequent accesses to the data.

In addition to maintaining internode coherency, system interface 24 may receive transactions through node interconnect 20 which require a data transfer to or from another processing node 12. System interface 24 performs the transfer, and provides the corresponding data for the transaction upon node interconnect 20, if appropriate. In the embodiment shown, system interface 24 is coupled to a point-to-point network 14. However, it is noted that in alternative embodiments other interconnect structures may be used.

It is noted that the system of FIG. 1 forms a NUMA architecture, in that the latency of accesses to shared memory 22 is dependent upon the particular node in which an initiating processor resides. The system of FIG. 1 also forms a NUCA architecture, in that the access time from a processor to other processor's caches may vary greatly depending upon the placement.

As will be described in further detail below, computer system 10 may be configured to perform optimized spin-lock operations. More particularly, code executing on processors 16 may be configured such that lock implementations result in a higher probability that contended locks will be handed over to threads executing within the same node. In addition, the number of processors spinning on a remotely held lock may be limited. In view of the non-uniform nature of the communication architecture, improved performance may thus be attained by reducing network traffic and by reducing migration of the lock (as well as the data the lock is protecting) from node to node.

FIGS. 2-5 are flow diagrams depicting operations associated with one embodiment of a spin-lock implementation. It is noted that the depicted operations may be performed in response to software instructions executable by any of processors 16 and stored, for example, in memory 22. It is also noted that differing threads executing within computer system 10 may independently perform the depicted functionality when lock contention occurs.

In the implementation of FIGS. 2-5, a lock is implemented by defining a local mirror of the lock in each node 12 of the computer system. The local mirror of the lock in each node is referred to as the local lock, and corresponding mirrors in other nodes are referred to as remote locks. A local variable in each node may be allocated to implement each local lock.

A local lock may be associated with any one of a number of states.

More particularly, in one embodiment, a local lock may be in a "free" state, a "local free" state, or a "remote" state. The free state indicates that the lock is not currently owned by any thread, and allows a processor in any node to acquire the lock. The local free state similarly indicates that no thread currently owns the lock, but allows only processors within the same node to acquire the lock. Finally, the remote state indicates that a thread executing in a remote processor currently holds the lock. Indications of any of these states may be encoded and stored in the coherence unit forming the lock. As will be discussed further below, a local lock may further identify a thread id of either a thread that has acquired the lock or of a thread that has attempted to acquire the lock.

In the following discussion, it is assumed that the system implementation contains a total of two nodes. It is also assumed that the local lock in one of the nodes is initialized in the free state while the mirror of the lock in the other node is initialized in the remote state. Other embodiments are possible that employ larger numbers of nodes.

Figure 2:
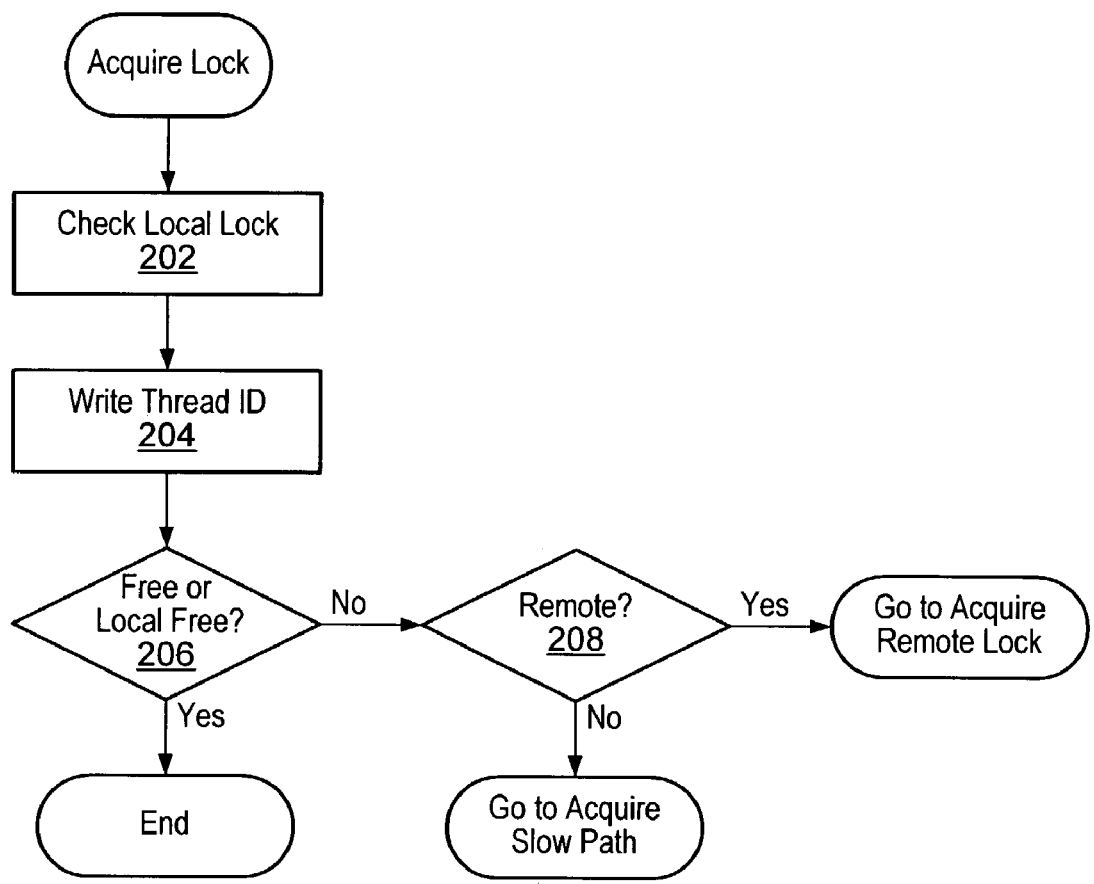
FIG. 2 is a flow diagram depicting operations associated with a spin lock implementation according to one embodiment.

A thread executing on a given processor 16 may attempt to obtain a software lock by initiating the lock acquisition steps depicted in FIG. 2. In steps 202 and 204, the content of the memory location forming the local lock is checked, and the thread id of the thread executing on the processor performing the check is written into the lock.

In one implementation, steps 202 and 204 may be performed atomically by executing a swap instruction. A swap instruction atomically writes a value to the addressed memory location and returns its original contents. It is noted that in other implementations, other atomic memory primitive operations and/or non-atomic memory primitive operations may alternatively be performed.

In step 206, if the content of the local lock indicates the lock was in a free or a local free state, the routine ends. It is noted that in this situation, the thread has acquired the lock, and the id of the thread acquiring the lock is stored with the content of the lock upon completion.

If, on the other hand, the lock was neither in a free or a local free state, a further check is performed in step 206 to determine whether the lock was in a remote state. If the lock was not in a remote state, an Acquire Slow Path Routine is performed, as discussed below with reference to FIG. 3. On the other hand, if the lock was in a remote state, an Acquire Remote Lock routine is performed, as discussed below with reference to FIG. 4. It is noted that the order of execution of steps 206 and 208 may be reversed.

Figure 3:
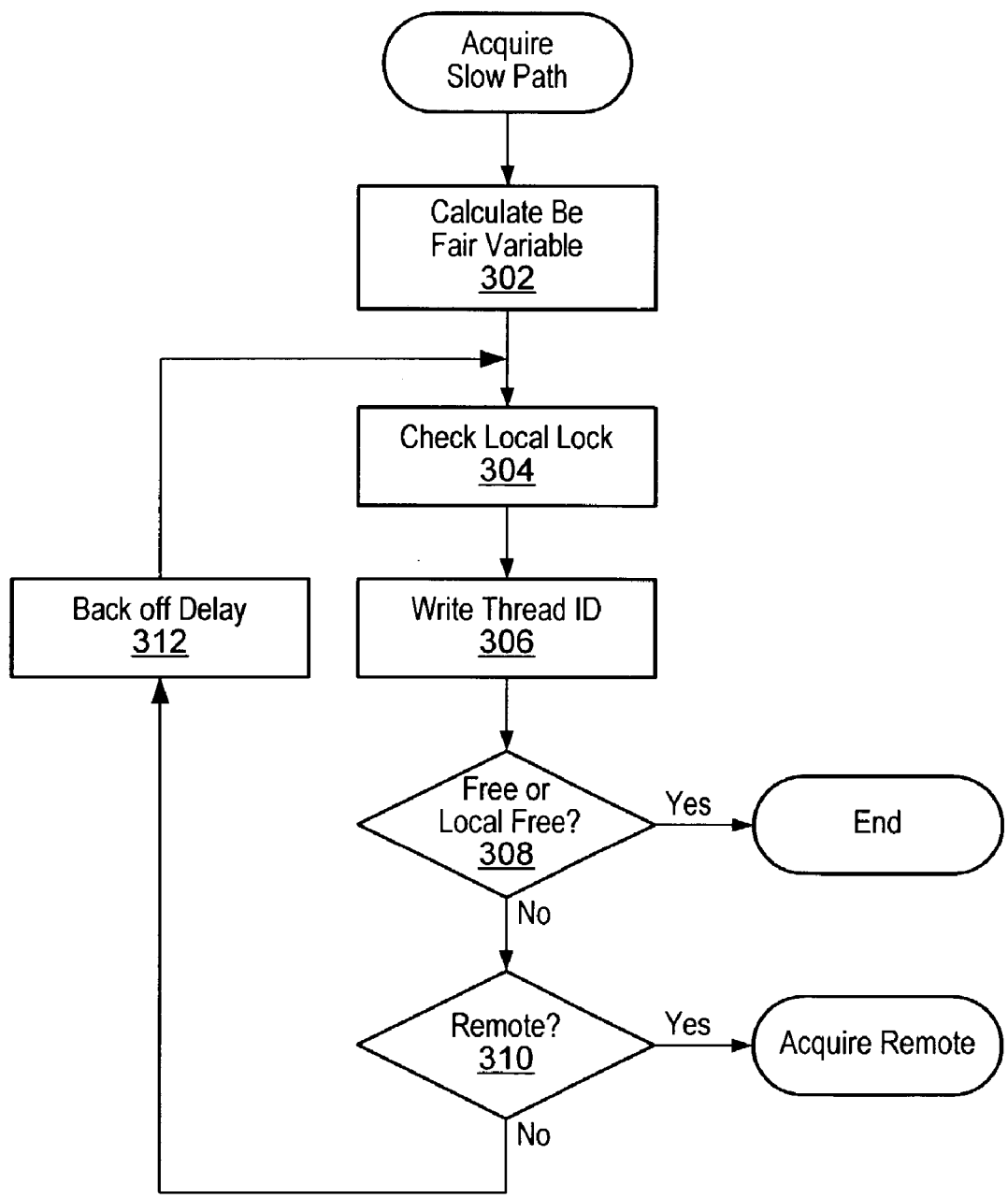
FIG. 3 is a flow diagram depicting further operations associated with a spin lock implementation.

FIG. 3 illustrates an implementation of an Acquire Slow Path Routine. The Acquire Slow Path Routine is performed by a thread executing on a processor when it has attempted to acquire a lock, but the lock is not in the free state, the local free state, or remote state. In this implementation, when in none of these states, the lock is either held by another thread executing on a processor within the same node, or the lock is held in a remote node and another processor in the same node is already spinning on the remote lock.

In step 302, a variable "Be_fair" is calculated. In one embodiment, the Be_fair value is a boolean value of either true or false. The function of the Be_fair variable will be discussed further below.

In steps 304 and 306, the content of the local lock is checked and the id of the thread performing the routine is written into the local lock. Similar to the previous description, steps 304 and 306 may be performed atomically through execution of, for example, a swap instruction. In step 308, if the content of the lock indicates the lock was in either a free or local free state, the routine ends. It is noted that in this situation, the thread has acquired the lock, and its id is stored in the content of the lock upon completion.

If, on the other hand, the lock was not in a free or a local free state, it is determined whether the lock was in the remote state (step 310). If the lock was in the remote state, the Acquire Remote Routine is performed. On the other hand, if the state of the lock was not in the remote state, a loop delay (i.e., backoff delay) is introduced in step 312, and the steps are repeated beginning at step 304. It is noted that steps 304-312 are repetitively performed until the state of the lock is returned in the free, local free or remote state.

In one embodiment, the delay introduced in step 312 may exponentially increase (e.g., with a capped delay value) during successive iterations of the acquire slow path routine, as desired. This may result in improved spin lock performance. In other embodiments, the delay introduced in step 312 may vary over time in other specific ways.

Figure 4:
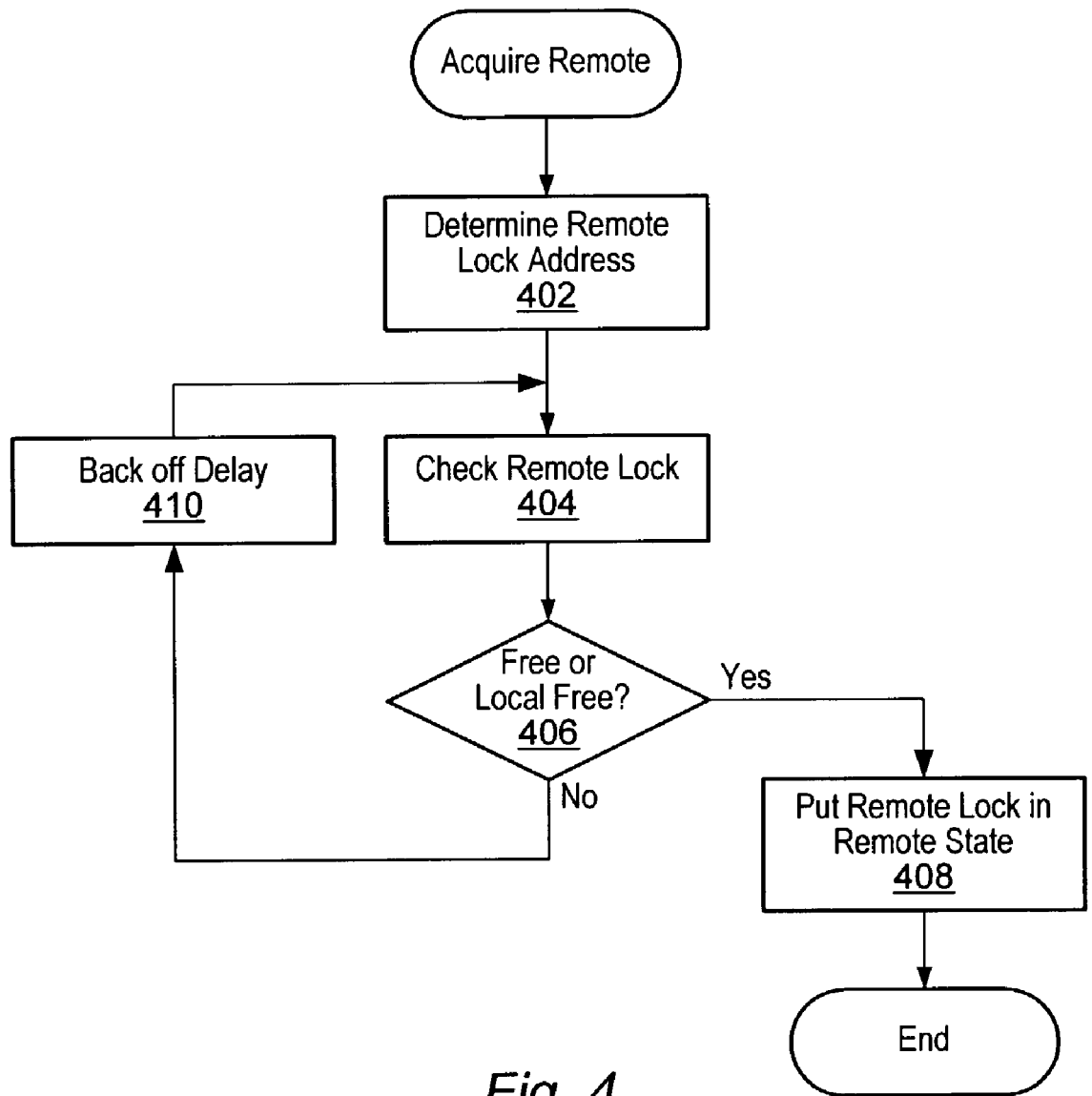
FIG. 4 is a flow diagram depicting operations associated with the acquisition of a remote lock.

FIG. 4 is a flow diagram illustrating one implementation of the Acquire Remote Routine. From the foregoing, it is noted that a thread executes the Acquire Remote Routine when it is determined that a lock it is attempting to acquire is held in a remote node. In step 402, the address of the remote lock is determined, if necessary. In one embodiment, the address of the lock in a remote node may be a fixed offset from the corresponding local lock address. It is noted that the address of a remote lock may be determined in alternative ways, as desired, depending upon the particular implementation.

In step 404, the content of the remote lock is checked. If the content of the remote lock indicates the remote lock is in a free state (step 406), the content of the remote lock is changed (i.e., written to) in step 408 to indicate the remote state. In one embodiment, steps 404, 406 and 408 may be performed atomically by executing a compare and swap (CAS) instruction. The CAS (address, expected value, new value) instruction atomically checks the content of the addressed memory location to see if it matches an expected value and, if so, replaces it with a new value. It is noted that in other implementations, other specific instructions may be utilized to determine whether the remote lock is in a free state and, if so, to change the state of the remote lock to the remote state. For example, in other implementations, a test and set operation or a swap operation may be utilized. Still other implementations may employ other atomic memory primitive operations and/or non-atomic memory primitive operations (e.g., load-linked) or load-locked), store-conditional operations).

If, on the other hand, it is determined in step 406 that the remote lock was not in the free state, a loop delay is introduced in step 410, and steps 404 and 406 are repeated. Like the foregoing, the loop delay provided in step 410 may vary over successive iterations. For example, in one embodiment, the delay introduced in step 410 increases exponentially, as desired. It is noted that a thread performing the Acquire Remote Routine will remain in the loop until the remote lock becomes free and its state is changed to remote. When this occurs, the processor spinning on the remote lock has acquired the lock, and the routine ends.

Figure 5:
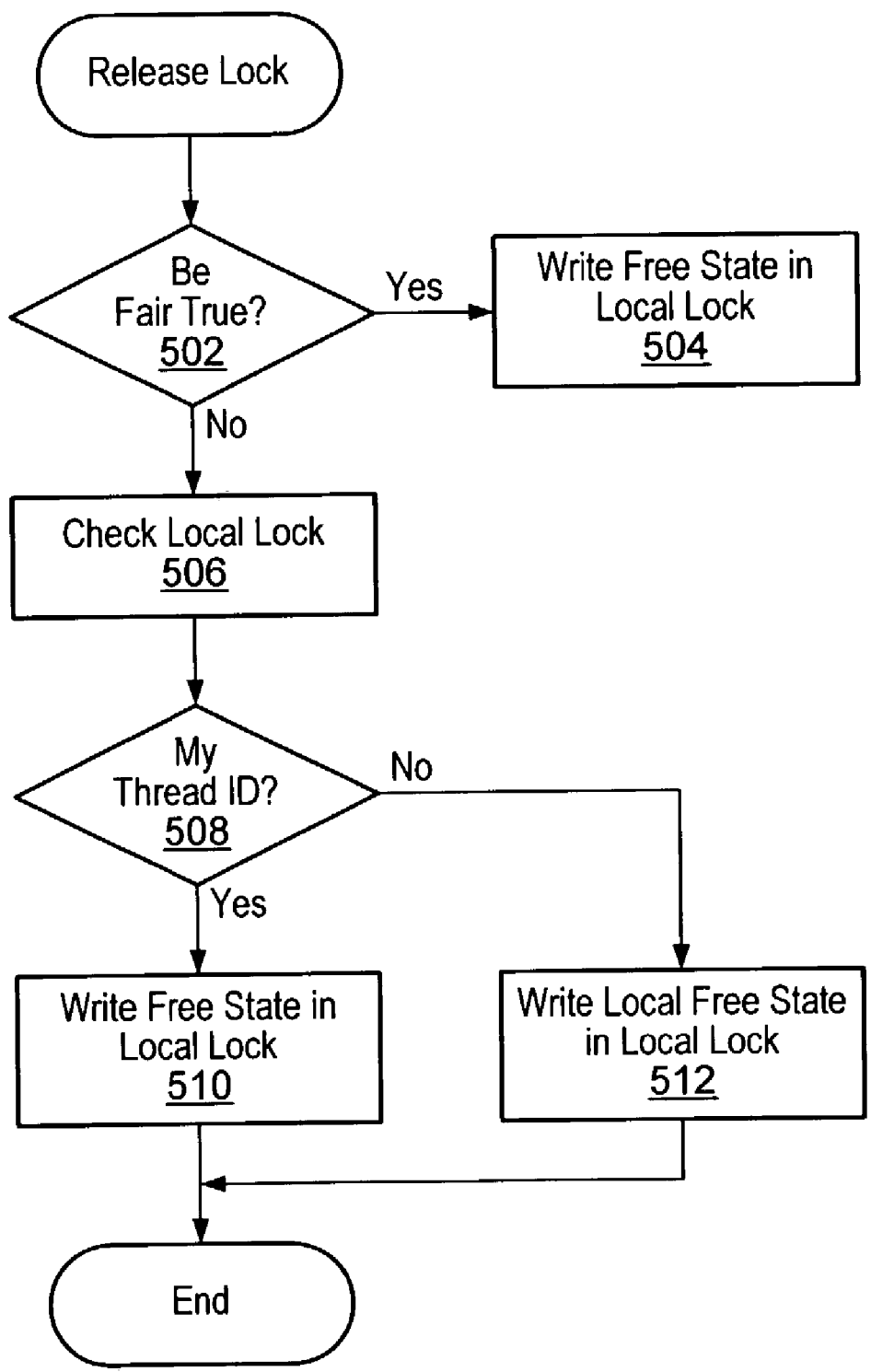
FIG. 5 is a flow diagram depicting operations associated with the release of a lock according to one embodiment.

FIG. 5 illustrates operations which may be performed to release a lock. In step 502, if the value of Be_fair is true, the free state is written into the local lock in step 504. On the other hand, if the Be_fair variable is false, the content of the local lock is checked in step 506.

If the content of the local lock contains a value equaling the id of the releasing thread (e.g., "my_thread id"), the local lock is released in the free state in step 510 (i.e., by writing to the local lock). Alternatively, if the content of the local lock does not contain the id of the releasing thread, the local lock is released in the local free state in step 512. In one embodiment, steps 506, 508 and 510 are performed atomically by executing a compare and swap instruction. In alternative embodiments, other atomic memory primitive operations and/or non-atomic memory primitive operations may be performed.

Thus, it is noted that if another processor within the same node attempted to acquire the lock while it was held by the releasing processor, the lock will not contain a value equaling the id of the releasing thread (e.g., my_thread id), but will instead contain a value equaling the id of the thread that attempted to acquire the lock. Accordingly, based on this, if another processor within the same node attempted to acquire the lock, the releasing thread will release the lock in the local free state in step 512. As stated previously, when released in the local free state, only processors within the same node will be able to acquire the lock. When the thread executing on that processor later acquires the lock in steps 304 and 308 of the Acquire Slow Path Routine, it may ultimately release the lock in the free state, if no other processors within the same node are continuing to attempt to acquire the lock. In this manner, it is more likely that a contended lock will be handed over to threads executing within the same node.

It is noted that Be_fair value is calculated randomly, and may be provided to prevent excessive bias towards processors within the same node. In the depicted implementation, based on the randomly generated Be_fair value, a processor releasing the lock is selectively forced to release the lock in the free state thus allowing processors in remote nodes to acquire the lock regardless of whether other local processors have attempted to acquire the lock. It is further noted that while the Be_fair value is calculated in step 302 of the Acquire Slow Path Routine, the Be_fair value could be calculated at alternative points in the code execution, as desired.

The following code sequence may be used to implement one embodiment of the operations depicted in FIGS. 2-5.

typedef volatile unsigned long rh_lock;

```
1:  void rh_acquire (rh_lock *L)
2:  {
3:      unsigned long tmp;
4:
5:      tmp = swap(L, my_tid);
6:      if (tmp == L_FREE || tmp == FREE)
7:          return;
8:      if(tmp == REMOTE) {
9:          rh_acquire_remote_lock(L);
10:         return;
11:     }
12:     rh_acquire_slowpath(L);
13: }
1:  void rh_acquire_slowpath(rh_lock *L)
2:  {
3:      unsigned long tmp;
4:      int b = BACKOFF_BASE, i
5:
6:      if ((random( ) % FAIR_FACTOR) == 0)
7:          Be_fair = TRUE;
8:      else
9:          Be_fair = FALSE;
10:
11:     while (1) {
12:         for (i = b; i; i--); // delay
13:         b = min(b * BACKOFF_FACTOR, BACKOFF_CAP);
14:         if(*L < FREE)
15:             continue;
16:         tmp = swap(L, my_tid);
17:         if(tmp == L_FREE || tmp == FREE)
18:             break;
```

```
                    -continued
19:            if(tmp == REMOTE) {
20:                rh_acquire_remote_lock(L);
21:                break;
22:            }
23:        }
24: }
1:  void rh_acquire_remote_lock(rh_lock *L)
2:  {
3:      int b = REMOTE_BACKOFF_BASE, i
4:
5:      L = get_remote_lock_addr(L, my_node_id);
6:
7:      while (1) {
8:          if(cas(L, FREE, REMOTE) == FREE)
9:              break;
10:         for (i = b; i; i--) ;// delay
11:         b = min(b * BACKOFF_FACTOR, REMOTE_
                BACKOFF_CAP);
12:     }
13: }
1:  void rh_release(rh_lock *L)
2:  {
3:      if (Be_fair)
4:          *L 32 FREE;
5:      else {
6:          if (cas(L, myid, FREE) != my_tid)
7:              *L = L_FREE;
8:      }
9:  56
```

In accordance with the foregoing, when multiple processors in different nodes of computer system 10 contend for a lock, the processors that spin in the node that currently owns the lock may have a greater likelihood of acquiring the lock. In addition, the number of processors spinning on a remotely held lock may be limited (e.g., in the above embodiment, only one processor may spin remotely). As a result, overall network traffic may be reduced, and the frequency of migration of the lock (and the data it is protecting) from node to node may be reduced. Overall improved performance may thus be attained.

While in the above embodiment, the number of processors spinning on a remotely held lock is limited (e.g., to only one processor), other embodiments may be possible that do not limit the number of processors spinning on a remotely held lock. In addition, to avoid starvation when a lock is held in a remote node, the number of processors that spin remotely may be increased over time based on various factors, such as, for example, the expiration of a predetermined time period or after a predetermined number of failed acquisition attempts. Similarly, the rate at which a processor spins on a remotely held lock may be increased over time.

In addition, yet additional alternative embodiments may be possible in which the number of processors spinning remotely is limited but wherein a local free state is not implemented that prevents processors in remote nodes from obtaining a lock.

Various embodiments may further include receiving, sending or storing instructions and/or data that implement the spin lock implementations of any of FIGS. 2-5 upon a computer readable medium. Generally speaking, a computer readable medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for controlling a software lock to a shared memory resource that is acquirable by processors in a plurality of nodes of a multiprocessing system, the method comprising:
   a first processor of a first node of the plurality of nodes acquiring the software lock;
   the first processor selectively releasing the software lock in a local free state by writing to a local software lock that allows another processor within the first node to acquire the software lock but that prevents processors in a remote node of the plurality of nodes from obtaining the software lock in response to a fairness value being in a false state and in response to an indication that the another processor in the same node attempted to acquire the software lock;
   the first processor releasing the software lock in a free state that allows all processors within any of the plurality of nodes to attempt to acquire the software lock in response to the fairness value being in a false state and in response to an indication that no other processor in the same node attempted to acquire the software lock; and
   the first processor also releasing the software lock in the free state in response to the fairness value being in a true state regardless of an indication that the another processor in the same node attempted to acquire the software lock.

2. The method as recited in claim 1 further comprising the first processor determining that another processor within the first node attempted to acquire the software lock.

3. The method as recited in claim 1, wherein the first processor acquiring the software lock further comprises:
   the first processor checking the state of a remote lock;
   the first processor determining that the state of the remote lock is free; and
   the first processor changing the state of the remote lock to remote.

4. The method as recited in claim 1 further comprising:
   a second processor of a second node of the plurality of nodes attempting to acquire the software lock;
   the second processor determining whether another processor within the second node is remotely spinning on the software lock; and
   the second processor remotely spinning on the software lock in response to determining that another processor in the second node is not remotely spinning on the software lock.

5. The method as recited in claim 1 further comprising the first processor acquiring the software lock comprises writing within the local lock of the first node a thread ID of the thread executing on the first processor.

6. The method as recited in claim 1, further comprising generating a state of the fairness value each time a given processor attempts to acquire the software lock and the software lock is either held by another processor in the same node, or the software lock is held by a processor in the remote node and another processor in the same node is spinning on the software lock.

7. The method as recited in claim 5 wherein the first processor executes a swap instruction to write the thread id and to determine the state of the software lock.

8. The method as recited in claim 6, further comprising generating a state of the fairness value randomly.

9. A multiprocessing computer system comprising:
a plurality of nodes including a plurality of processors;
wherein a first processor of a first node of the plurality of nodes is configured to acquire a software lock to a shared memory resource;
wherein the first processor is configured to selectively release the software lock in a local free state by writing to a local lock that allows another processor within the first node to acquire the software lock but that prevents processors in a remote node of the plurality of nodes from obtaining the software lock in response to a the fairness value being in a false state and in response to an indication that the another processor in the same node attempted to acquire the software lock;
wherein the first processor is further configured to release the software lock in a free state that allows all processors within any of the plurality of nodes to attempt to acquire the software lock in response to the fairness value being in a false state and in response to an indication that no other processor in the same node attempted to acquire the software lock; and
wherein the first processor is further configured to release the software lock in the free state in response to the fairness value being in a true state regardless of an indication that any other processor in the same node attempted to acquire the software lock.

10. The multiprocessing computer system as recited in claim 9 wherein the first processor is configured to acquire the software lock by checking the state of a remote lock and changing the state of the remote lock to remote.

11. The multiprocessing computer system as recited in claim 9 further comprising:
a second processor of a second node of the plurality of nodes;
wherein the second processor is configured to attempt to acquire the software lock;
wherein the second processor is further configured to determine whether another processor within the second node is remotely spinning on the software lock; and
wherein the second processor is configured to remotely spin on the software lock in response to determining that another processor in the second node is not remotely spinning on the software lock.

12. The multiprocessing computer system as recited in claim 9, wherein a given processor attempting to acquire the software lock is configured to generate a state of the fairness value each time the given processor attempts to acquire the software lock and the software lock is either held by another processor in the same node, or the software lock is held by a processor in the remote node and another processor in the same node is spinning on the software lock.

13. The multiprocessing computer system as recited in claim 12, wherein the given processor is configured to generate the state of the fairness value randomly.

14. A computer readable storage including program instructions executable to implement a method for controlling a software lock to a shared memory resource, the software lock being acquirable by processors in a plurality of nodes of a multiprocessing system, wherein the method comprises:
a first processor of a first node of the plurality of nodes acquiring the software lock;
the first processor selectively releasing the software lock in a local free state that allows another processor within the first node to acquire the software lock but that prevents processors in a remote node of the plurality of nodes from obtaining the software lock in response to a fairness value being in a false state and in response to an indication that the another processor in the same node attempted to acquire the software lock;
the first processor releasing the software lock in a free state that allows all processors within in any of the plurality of nodes to attempt to acquire the software lock in response to the fairness value being in a false state and in response to an indication that no other processor in the same node attempted to acquire the software lock; and
the first processor releasing the software lock in the free state in response to the fairness value being in a true state regardless of an indication that any other processor in the same node attempted to acquire the software lock.

15. The computer readable storage recited in claim 14 wherein the first processor acquiring the software lock further comprises:
the first processor checking the state of a remote lock;
the first processor determining that the state of the remote lock is free; and
the first processor changing the state of the remote lock to remote.

16. The computer readable storage recited in claim 14 wherein the method further comprises:
a second processor of a second node of the plurality of nodes attempting to acquire the software lock;
the second processor determining whether another processor within the second node is remotely spinning on the software lock; and
the second processor remotely spinning on the software lock in response to determining that another processor in the second node is not remotely spinning on the software lock.

17. The computer readable storage recited in claim 14, wherein a given processor attempting to acquire the software lock generating a state of the fairness value each time the given processor attempts to acquire the software lock and the software lock is either held by another processor in the same node, or the software lock is held by a processor in the remote node and another processor in the same node is spinning on the software lock.

18. The computer readable storage recited in claim 17, wherein the given processor generating the state of the fairness value randomly.

* * * * *